(12) United States Patent
Park

(10) Patent No.: US 12,164,343 B2
(45) Date of Patent: Dec. 10, 2024

(54) HINGED DEVICE CONDUCTOR PATHWAY

(71) Applicant: Microsoft Technology Licensing, LLC, Redmond, WA (US)

(72) Inventor: Daniel C. Park, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 347 days.

(21) Appl. No.: 17/565,805

(22) Filed: Dec. 30, 2021

(65) Prior Publication Data
US 2023/0213981 A1    Jul. 6, 2023

(51) Int. Cl.
| | |
|---|---|
| H05K 5/00 | (2006.01) |
| G06F 1/16 | (2006.01) |
| E05D 3/18 | (2006.01) |
| E05D 11/00 | (2006.01) |

(52) U.S. Cl.
CPC ............ *G06F 1/1681* (2013.01); *E05D 3/18* (2013.01); *E05D 11/0081* (2013.01); *E05Y 2999/00* (2024.05)

(58) Field of Classification Search
None
See application file for complete search history.

(56) References Cited

U.S. PATENT DOCUMENTS

| | | | |
|---|---|---|---|
| 5,581,440 A | 12/1996 | Toedter | |
| 5,608,604 A * | 3/1997 | Francis | G06F 1/1681 439/31 |
| 5,764,384 A * | 6/1998 | Wilcox | H04N 1/00543 358/496 |
| 8,306,575 B2 | 11/2012 | Kubodera et al. | |
| 8,724,306 B2 | 5/2014 | Ashcraft | |
| 8,938,856 B1 | 1/2015 | Shin et al. | |
| 9,013,867 B2 | 4/2015 | Becze et al. | |
| 10,856,430 B2 | 12/2020 | Yoo et al. | |
| 2006/0082518 A1* | 4/2006 | Ram | G06F 1/1635 345/1.1 |
| 2012/0257368 A1 | 10/2012 | Bohn | |
| 2020/0033916 A1 | 1/2020 | Aagaard et al. | |
| 2021/0232182 A1 | 7/2021 | Peng et al. | |

OTHER PUBLICATIONS

"International Search Report and Written Opinion Issued in PCT Application No. PCT/US22/044049", Mailed Date: Jan. 9, 2023, 12 Pages.

* cited by examiner

*Primary Examiner* — Stephen W Jackson
(74) *Attorney, Agent, or Firm* — Rainier Patents, P.S.

(57) ABSTRACT

The description relates to hinged devices, such as hinged computing devices. One example can include a first portion including an electronic component and a second portion including a second electronic component. A hinge assembly can rotatably secure the first and second portions through a range of rotation from a closed orientation to an open orientation. A dumbbell-shaped shield assembly can be configured to provide an orientation-specific protective pathway between the first portion and the second portion for a conductor extending from the first electronic component to the second electronic component.

20 Claims, 16 Drawing Sheets

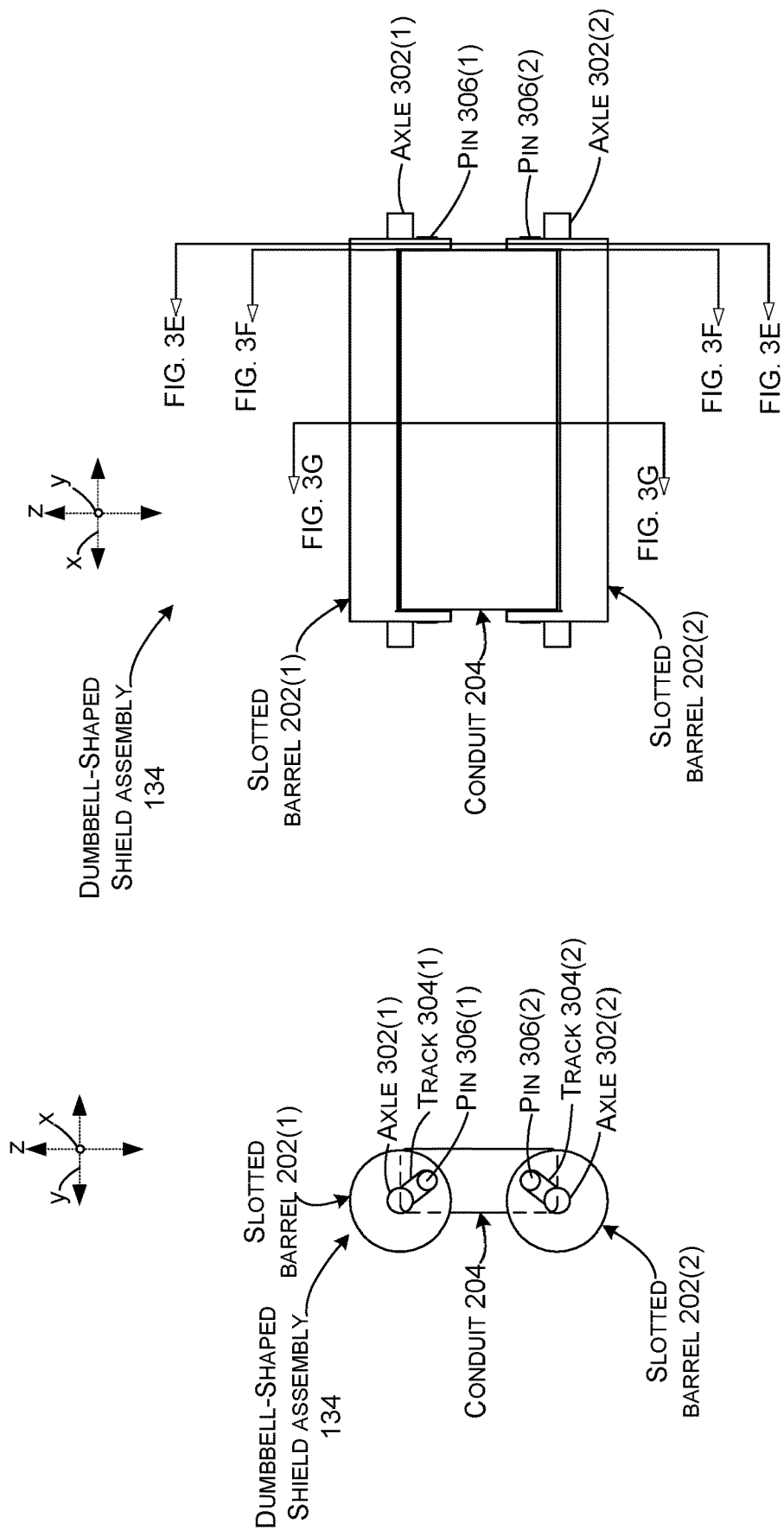

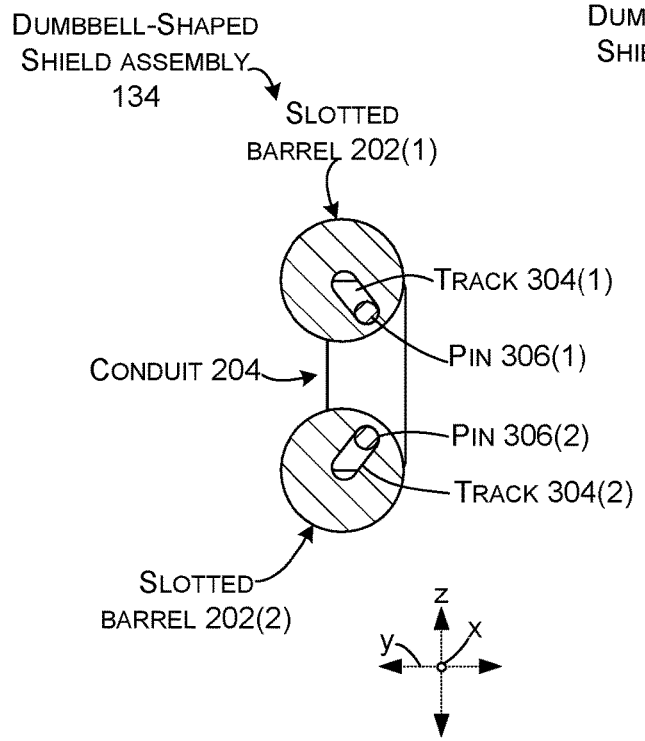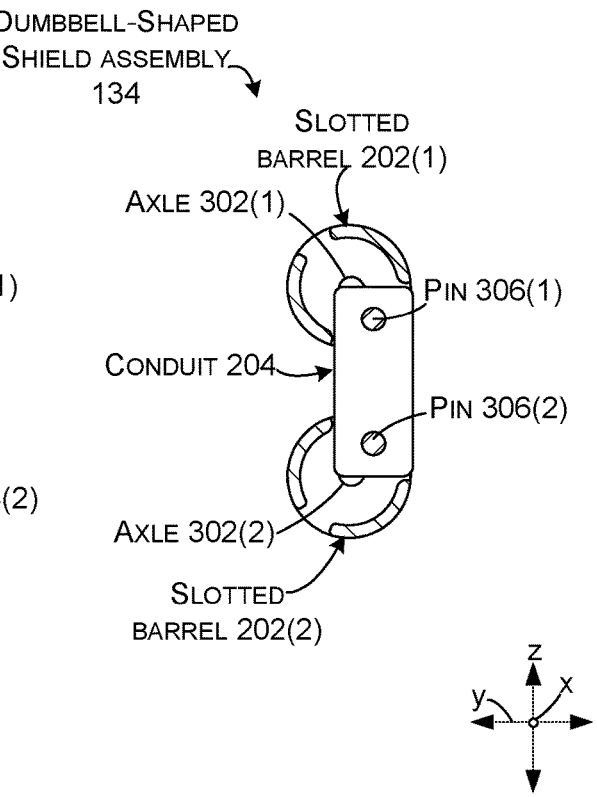
FIG. 3E   FIG. 3F
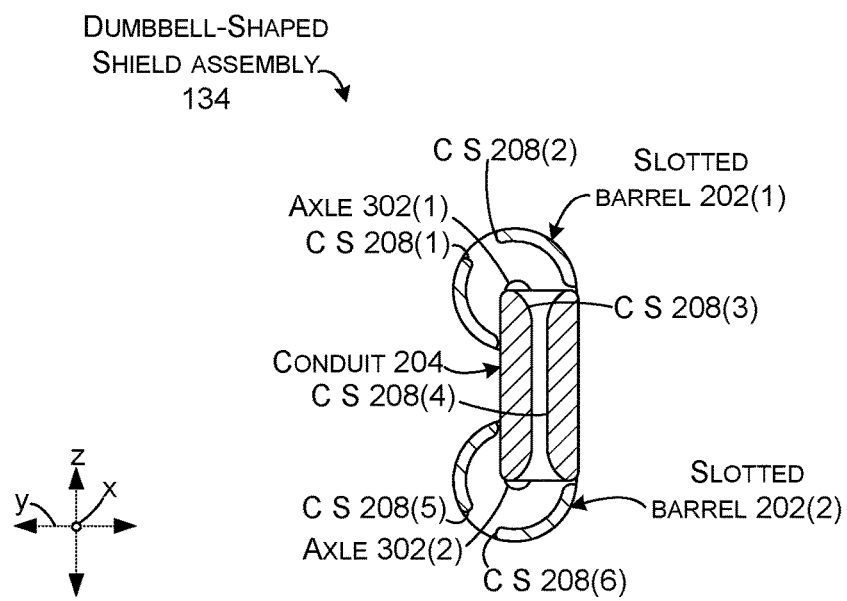
FIG. 3G

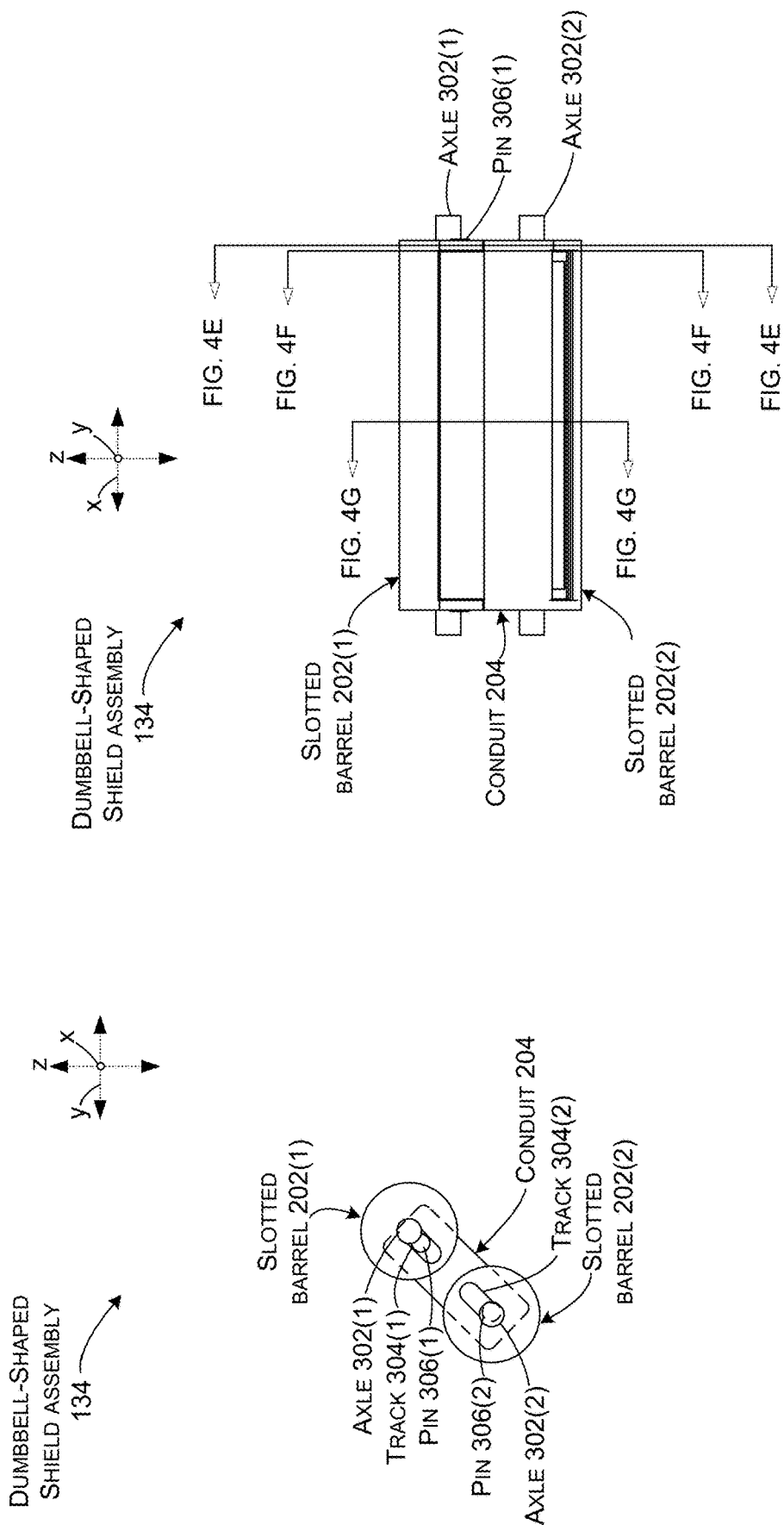

HINGED DEVICE CONDUCTOR PATHWAY

BACKGROUND

Many computer form factors such as smart phones, tablets, and notebook computers can provide enhanced functionality by folding for storage and opening for use. For instance, the folded device is easier to carry and the opened device offers more input/output area. Foldable devices can include conductors extending between the different foldable parts.

SUMMARY

This patent relates to hinged devices, such as hinged computing devices. One example can include a first portion including a first electronic component and a second portion including a second electronic component. A hinge assembly can rotatably secure the first and second portions through a range of rotation from a closed orientation to an open orientation. A dumbbell-shaped shield assembly can be configured to provide an orientation-specific protective pathway between the first portion and the second portion for a conductor extending from the first electronic component to the second electronic component.

This example is intended to provide a summary of some of the described concepts and is not intended to be inclusive or limiting.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced. Where space permits, elements and their associated reference numbers are both shown on the drawing page for the reader's convenience. Otherwise, only the reference numbers are shown. Note that some figures illustrate many elements and adding lead lines to all of the elements can diminish readability of the figure. Accordingly, not every element is designated in every figure.

FIGS. 3C, 3D, 4C, 4D, 5C, 5D, and 6 show elevational views of example devices in accordance with some implementations of the present concepts.

FIGS. 2A-2C, 3E-3G, 4E-4G, and 5E-5G show sectional views of example devices in accordance with some implementations of the present concepts.

DESCRIPTION

The present concepts relate to devices, such as computing devices that have rotationally secured (e.g., hinged) first and second device portions. Hinge assemblies can provide hinge functionality between the first and second device portions. Conductors are routed between the first and second portions to couple electronic components, such as displays. Some previous configurations routed the conductors through the hinge assemblies, which increased the space occupied by the hinge assemblies and decreased the size of the displays. The present concepts provide a set of rigid components that can move relative to one another and the first and second portions to provide a protective pathway for the conductors between the first and second portions as they rotate through various orientations.

Figure 1A:
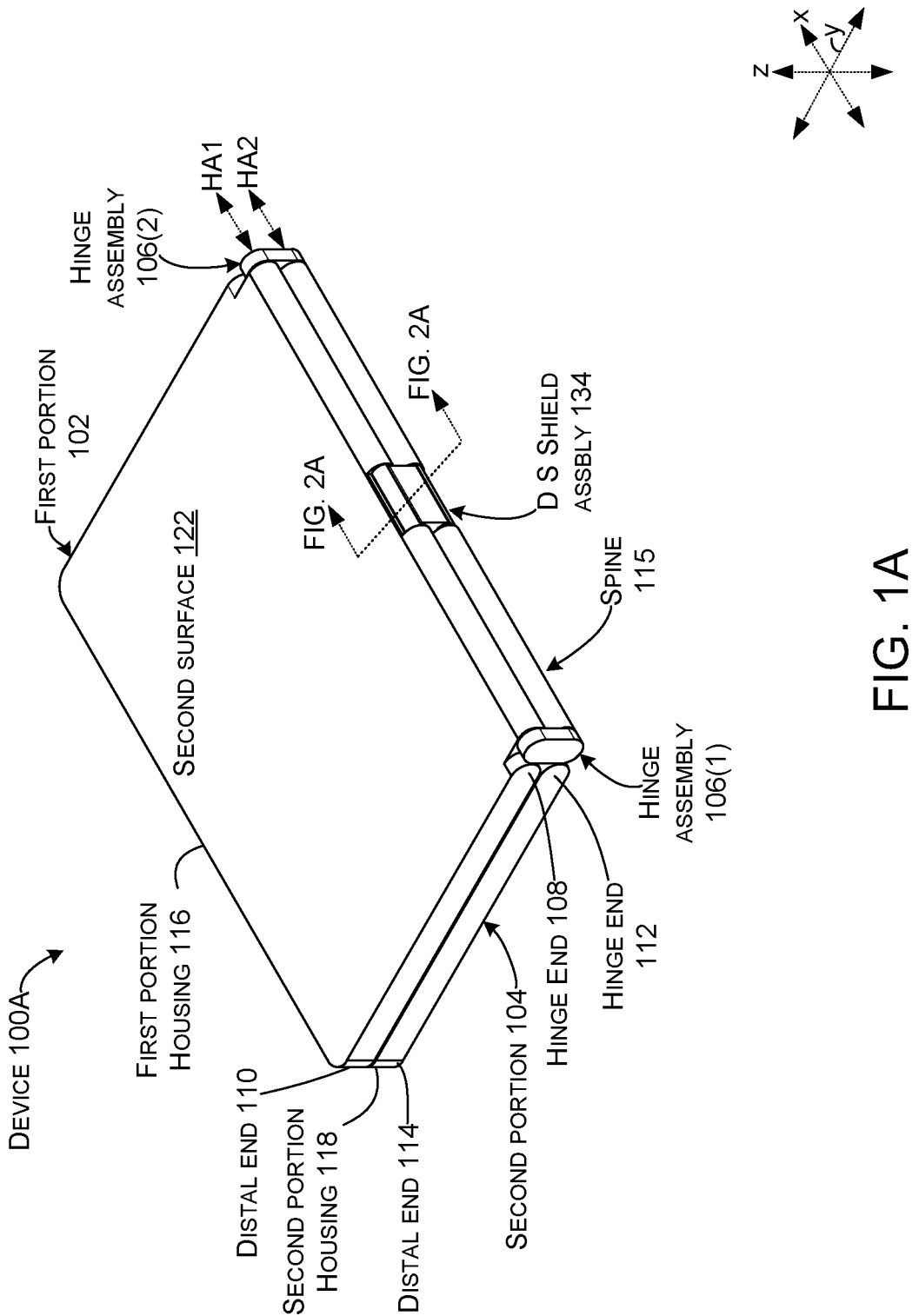
FIGS. 1A-1C, 3A, 4A, and 5A show perspective views of example devices in accordance with some implementations of the present concepts.
Figure 1B:
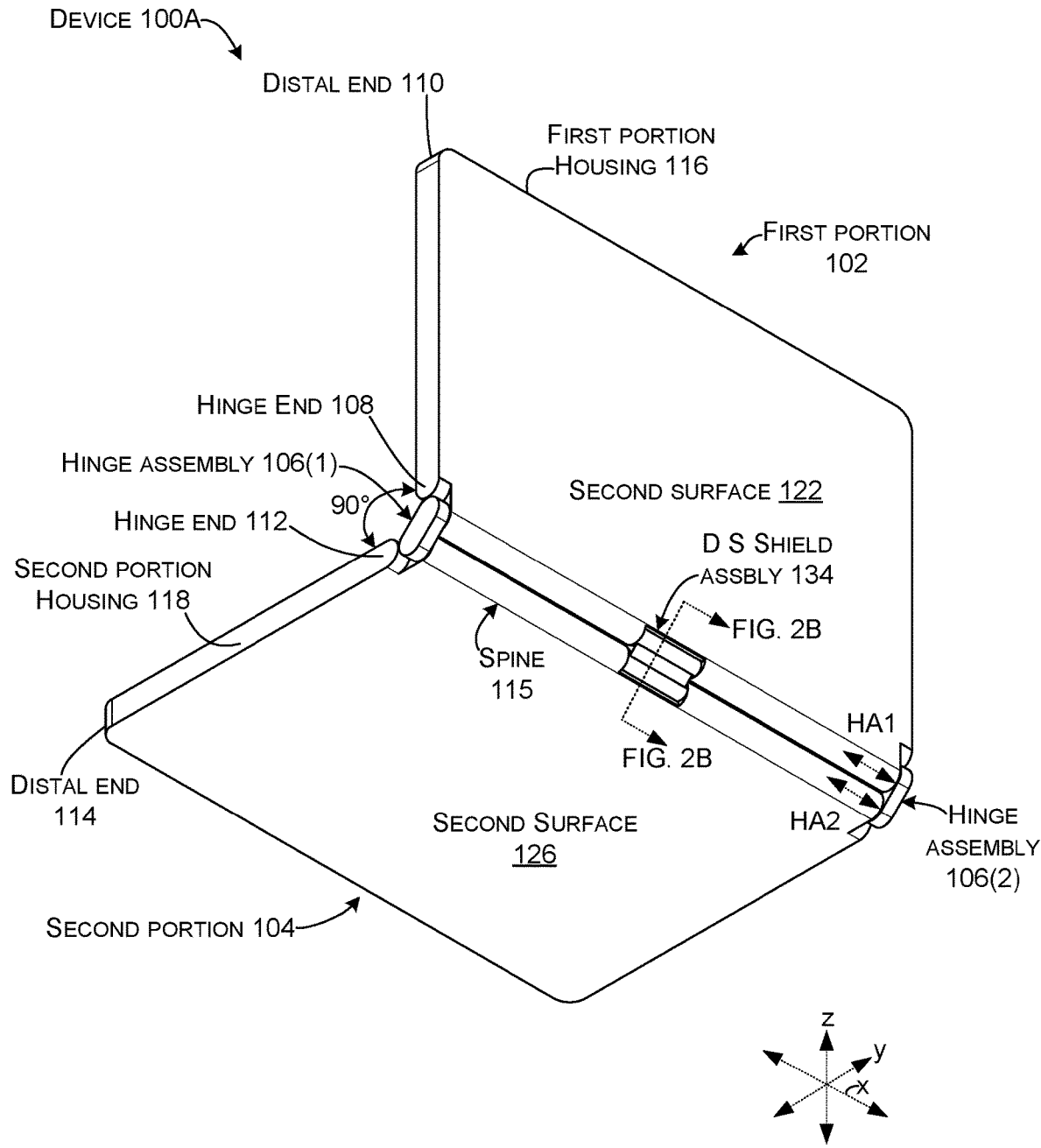
Figure 1C:
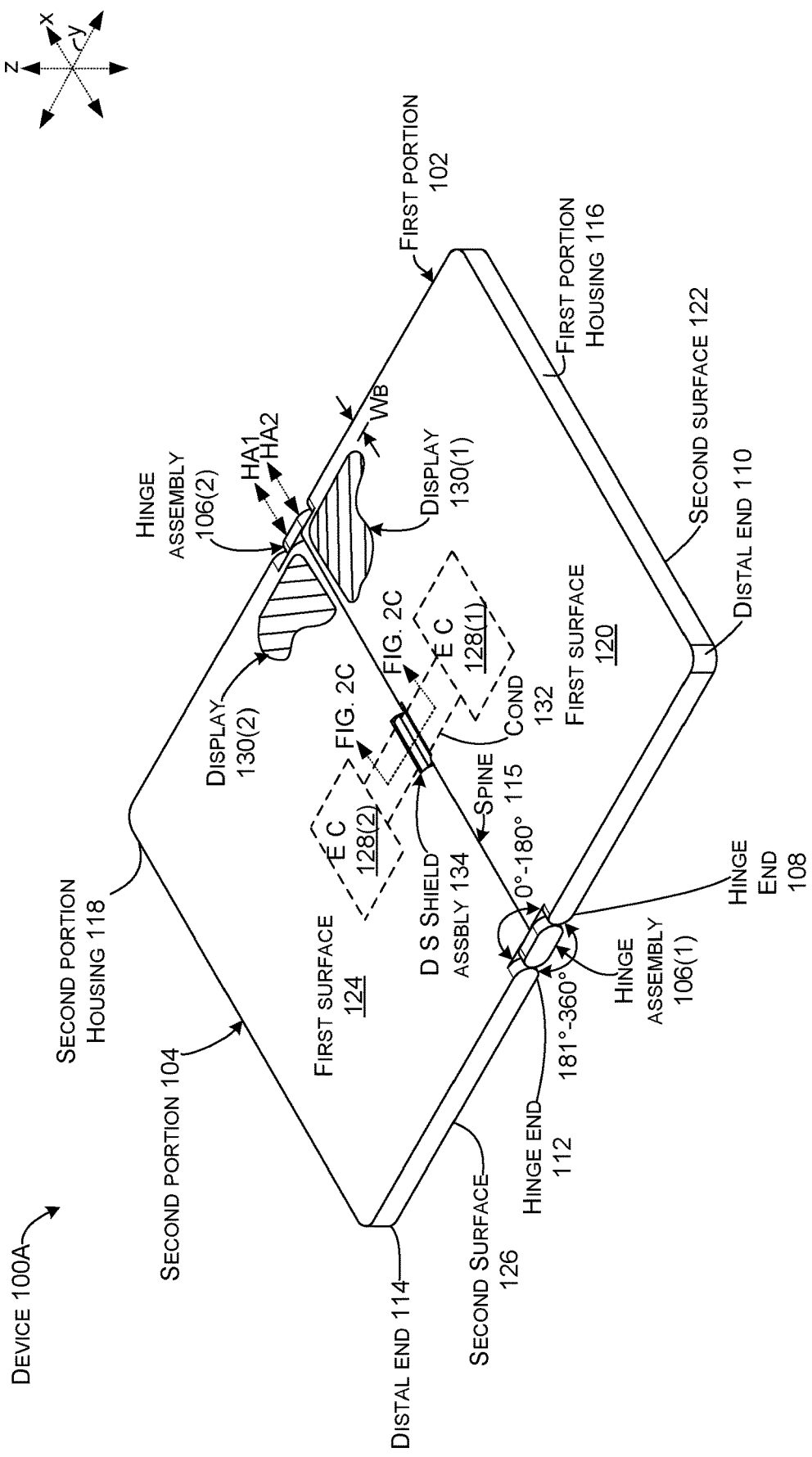

Introductory FIGS. 1A-1C collectively show an example device 100A that has first and second portions 102 and 104 that are rotatably secured together by hinge assemblies 106. (The use of a suffix e.g., 'A' with the designator 100 is intended to indicate that elements of the various described devices, such as device 100B of FIG. 6 may be the same or different). The hinge assemblies 106 can rotatably secure the first and second portions 102 and 104 through a range of rotations, such as from a zero-degree or closed orientation illustrated in FIG. 1A through various angles, such as the 90-degree orientation of FIG. 1B and/or various oblique angles to the 180-degree orientation shown in FIG. 1C. In some implementations, the range of rotations may continue, such as all the way to a 360-degree orientation.

In the illustrated implementation, two hinge assemblies 106(1) and 106(2) are employed at opposing ends of the device, but other implementations could employ different numbers of hinge assemblies and/or locations for the hinge assemblies. The first portion 102 can extend from a hinge end 108 to a distal end 110. The second portion 104 also can extend from a hinge end 112 to a distal end 114. A region of the device defined by hinge end 108, hinge assemblies 106, and hinge end 112 can be termed a 'spine' 115 of the device. In this implementation, the hinge assemblies 106 can define two hinge axes HA. The first portion 102 can rotate around first hinge axis HA1 and the second portion 104 can rotate around second hinge axis HA2. Other implementations can define a single hinge axis or more than two hinge axes.

In some implementations, the hinge assemblies 106 can provide a timing or synchronizing function so that rotation around one hinge axis is accompanied by equivalent rotation around the other hinge axis. For instance, 20 degrees of rotation of the first portion 102 around hinge axis one (HA1) would be accompanied by a simultaneous and equivalent 20 degrees of rotation of the second portion around hinge axis two (HA2). Other hinge assemblies may not provide a synchronizing function. The present concepts can accommodate either synchronized or non-synchronized rotation.

In some cases, the device can include a housing (designated as first portion housing 116 and second portion housing 118). The first portion housing 116 can define opposing first and second major surfaces 120 and 122 (hereinafter, first and second surfaces). Similarly, the second portion housing 118 can define opposing first and second major surfaces 124 and 126 (hereinafter, first and second surfaces).

In some implementations, the device 100A can include electronic components 128 (FIG. 1C) that can be positioned on the first and second portions 102 and 104, such as in/on the first portion housing 116 and/or the second portion housing 118. Example electronic components 128 (FIG. 1C) are shown in ghost below the first surfaces 120 and 124. Example electronic components can include processors, memory, storage, batteries, etc. Other example electronic components 128 can include displays 130. The displays 130 can be positioned on the first and/or second surfaces 120, 122, 124, and/or 126, respectively. In the illustrated configuration, the displays 130 are positioned on first surfaces 120 and 124, respectively.

Electronic components 128(1) and 128(2) positioned on the first and second portions, respectively, can be electrically coupled by conductors 132. A dumbbell-shaped shield assembly 134 can be configured to provide an orientation-specific protective pathway (FIGS. 2A-2C) for the conductor 132 between the first portion 102 and the second portion 104.

Note that in this illustrated configuration, dumbbell-shaped shield assembly 134 is separate from the hinge assemblies 106 (e.g., is not part of the hinge assemblies). The hinge assemblies 106 may be too thick for the displays 130 to be positioned over them. However, the dumbbell-shaped shield assembly 134 can be thinner than the hinge assemblies and can be configured to allow the displays to be positioned over it. This configuration can allow the hinge assemblies 106 to be thinner in the x reference direction so that the displays 130 can cover a higher percentage of the first surfaces 120 and 124 (e.g., the bezel width WB is reduced). The dumbbell-shaped shield assemblies 134 do not interfere with the displays 130 and so overall display real estate can be increased by employing dedicated hinge assemblies 106 for controlling rotation of the first and second portions and a dedicated dumbbell-shaped shield assembly 134 for protecting conductors traversing the spine 115.

In the illustrated configuration, the dumbbell-shaped shield assembly 134 is centrally located on the device so that the conductors 132 do not have to extend up from the electronic components 128 to the hinge assemblies 106 and back down to the electronic components 128 on the other portion and instead experience basically a straight path through the spine 115. This 'straight path' configuration afforded by the dumbbell-shaped shield assembly 134 can allow conductor types that are not suitable when the conductors experience sharp bends though the hinge assembly. For instance, the present implementations can employ flexible printed circuits (FPCs) or ribbon cable that travel through the dumbbell-shaped shield assembly 134. FPCs or ribbon cable can be employed without risk of failure because of the protection offered by the dumbbell-shaped shield assembly 134 as well as the minimum bend radius (shown FIG. 2A) experienced by the FPC that is defined by the dumbbell-shaped shield assembly 134.

In the illustrated configuration, the dumbbell-shaped shield assembly 134 is centrally located and occupies a subset of the distance between the hinge assemblies 106. In other configurations, the dumbbell-shaped shield assembly 134 can extend along nearly an entirety of the distance (along the hinge axes (e.g., along the x reference axis)) between the hinge assemblies 106. For instance, the dumbbell-shaped shield assembly 134 can extend the entirety of the distance except for about 1 millimeter at each end where the dumbbell-shaped shield assembly 134 connects to the housings 116 and 118 proximate to the hinge assemblies 106.

This latter configuration where the dumbbell-shaped shield assembly 134 extends almost entirely between the hinge assemblies 106 can create a more uniform appearance at the spine 115 and more thoroughly protect against foreign material entering the device and/or interfering with rotation. Thus, the dumbbell-shaped shield assembly 134 can also eliminate the need for a 'dust cover' or other cover over the spine. In such a configuration, the dumbbell-shaped shield assembly 134 provides a technical solution of providing protection to the conductor as well as the overall device while also eliminating the need for a separate cover over the spine. The technical solution is achieved with a combination of rigid components in the form of a dumbbell-shaped shield assembly, which can protect the conductor by totally encapsulating the conductor through the spine without any of the components flexing during rotation. Totally encapsulating can mean that the conductor is not visible at the spine and/or exposed to foreign matter or other device components as it travels through the spine at all orientations of the range of rotations.

Figure 2A:
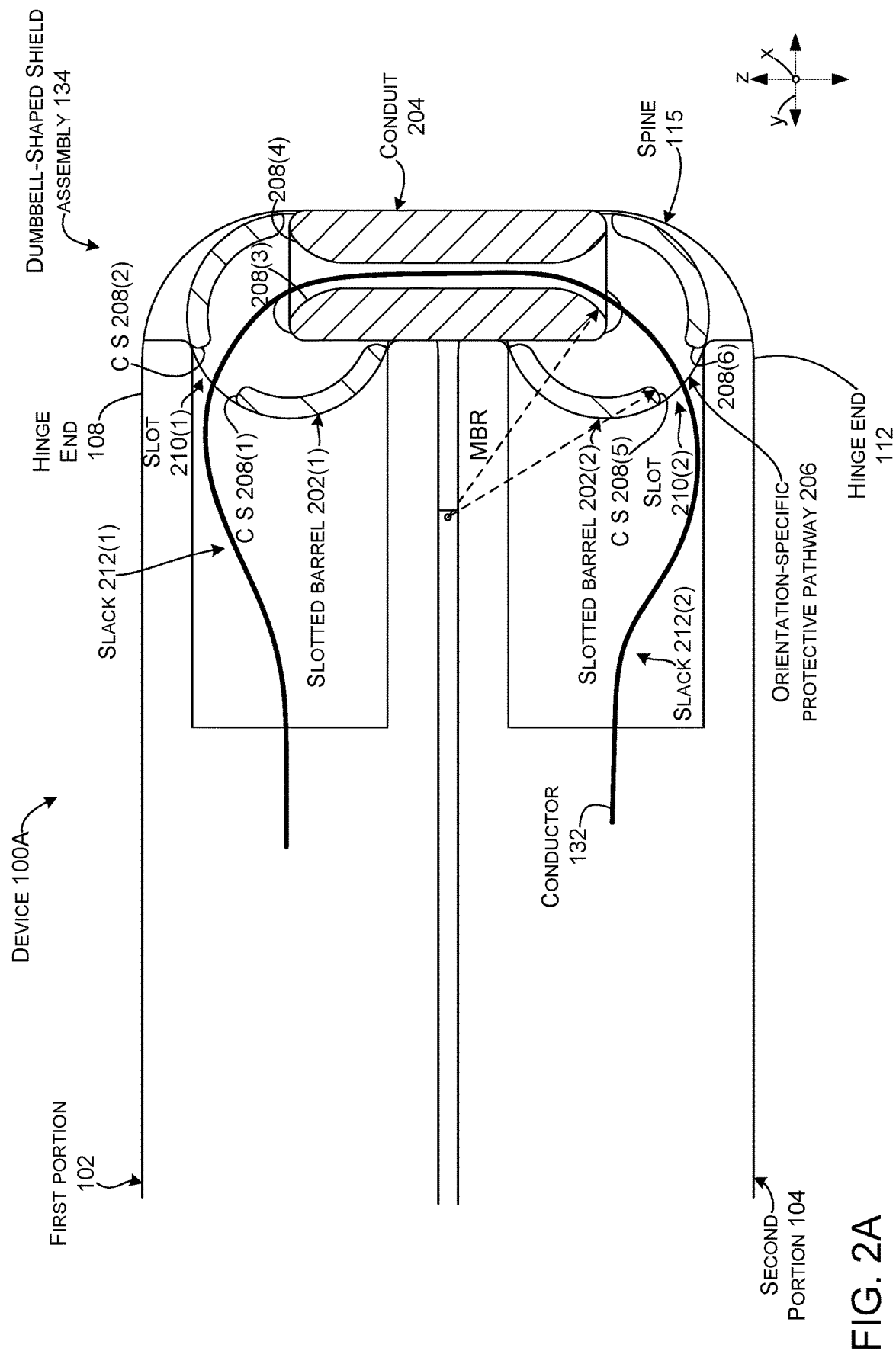
Figure 2B:
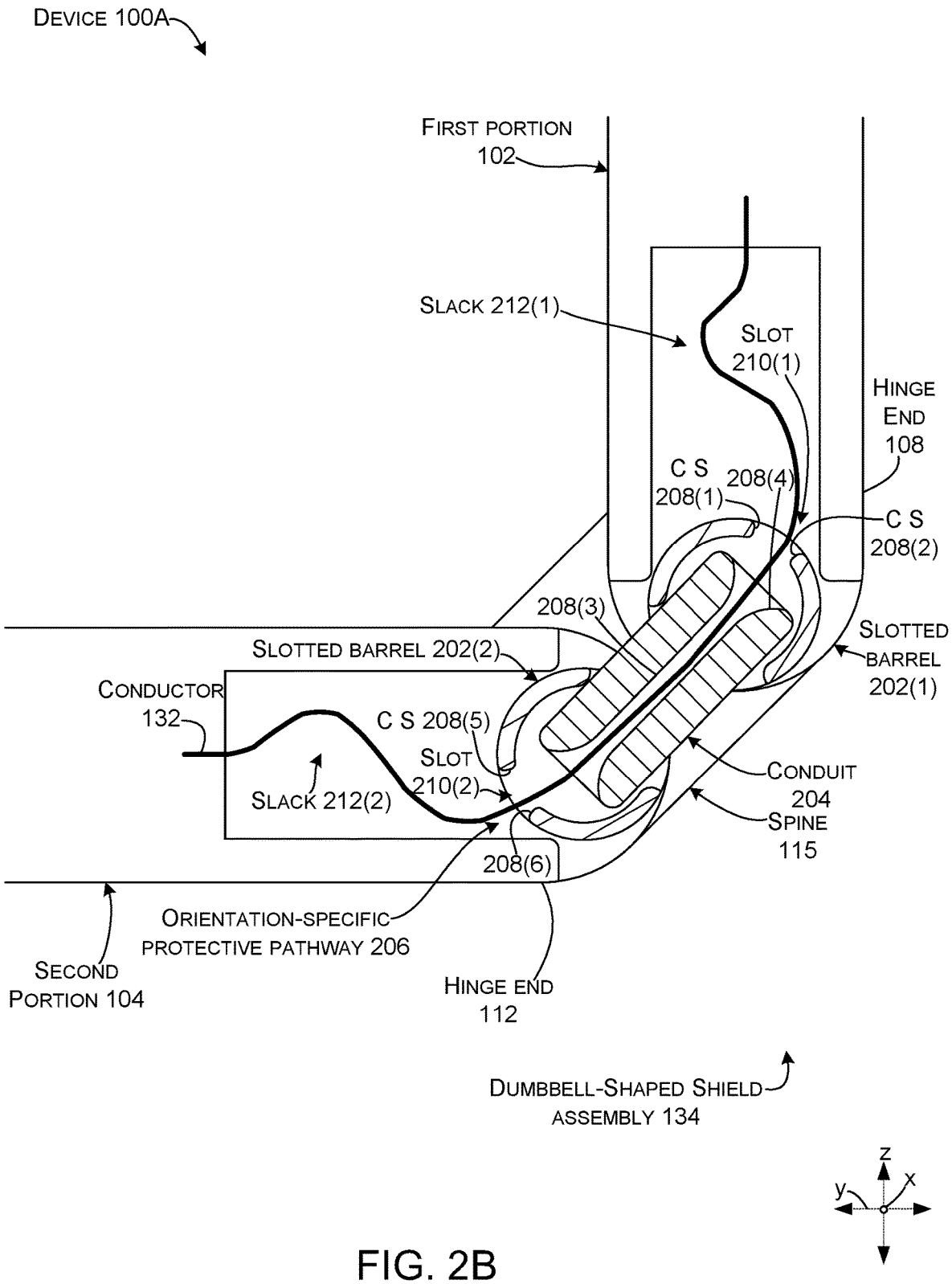
Figure 2C:
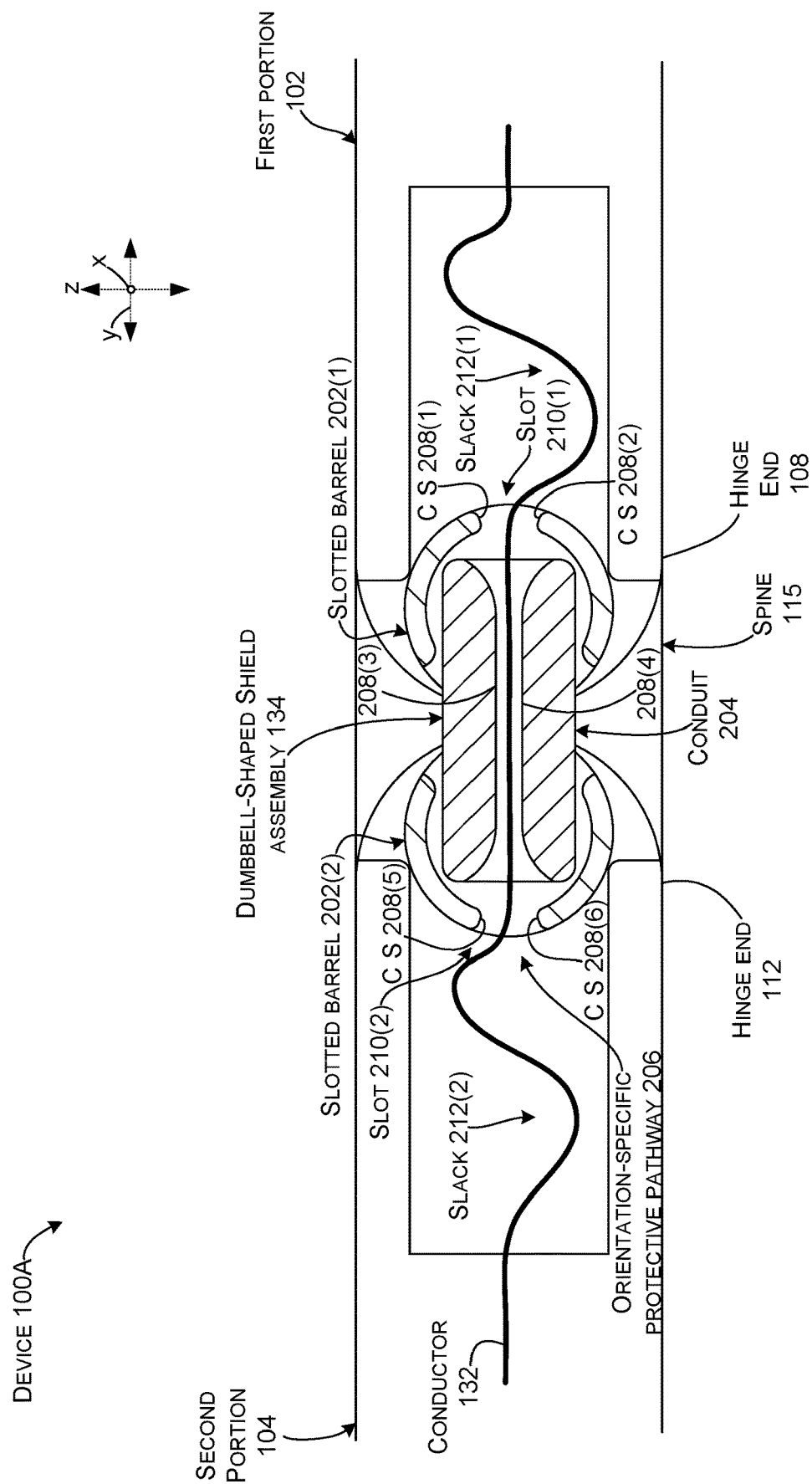

FIGS. 2A-2C collectively show dumbbell-shaped shield assembly 134 at the zero, 90, and 180-degree orientations, respectively. The dumbbell-shaped shield assembly 134 can protect the conductors 132 extending from the electronic components (128(1), FIG. 1C) on the first portion 102 to the electronic components (128(2), FIG. 1C) on second portion 104 when the first and second portions are rotated through a range of orientations.

In this example, the dumbbell-shaped shield assembly 134 includes rigid bodies in the form of slotted barrels 202 and conduit 204. In this case, the slotted barrels 202 are positioned on opposite ends of conduit 204. Slotted barrel 202(1) is associated with the first portion 102 and slotted barrel 202(2) is associated with the second portion 104. The slotted barrels 202 and the conduit 204 can collectively define an orientation-specific protective pathway 206 across the spine 115 for conductor(s) 132 extending from the electronic components 128 on one portion to electronic components 128 on the other portion. The orientation-specific protective pathway 206 can protect the conductor 132 from exposure to external damage at the spine 115. Stated another way, the orientation-specific protective pathway 206 can prevent the conductor 132 from being exposed at the hinge ends 108 and 112, at any orientation during the range of rotation.

The orientation-specific protective pathway 206 can also define (e.g., limit) a minimum bend radius (MBR, FIG. 2A) that the conductor 132 experiences during the range of rotation. By defining the minimum bend radius, the orientation-specific protective pathway 206 reduces any chance of the conductor 132 being degraded from bending too sharply. Toward this end, the orientation-specific protective pathway 206 can be defined by (e.g., bounded by) contact surfaces (e.g., bumpers) 208 that contribute to the orientation-specific protective pathway. In this configuration contact surfaces 208(1) and 208(2) are defined by slotted barrel 202(1) and define slot 210(1), therebetween. Contact surfaces 208(3) and 208(4) are defined by conduit 204. Contact surfaces 208(5) and 208(6) are defined by slotted barrel 202(2) and define slot 210(2), therebetween.

Other configurations of the dumbbell-shaped shield assembly 134 may have different numbers and/or arrangements of components and/or contact surfaces 208. The shape of the orientation-specific protective pathway 206 defined by the contact surfaces 208 can change based upon the orientation of the first and second portions 102 and 104. Stated another way, the orientation-specific protective pathway 206 can be orientation-specific to provide multiple types of protection depending on the orientation of the first and second portions 102 and 104. Thus, this implementation provides a technical solution that employs multiple rigid bodies/components to completely protect the conductor 132 at the spine 115 through the entire range of rotation and the multiple rigid components (e.g., the slotted barrels 202 and the conduit 204) can move relative to one another and the first and second portions to collectively define the orientation-specific protective pathway 206 for the conductor 132.

In the zero-degree, 90-degree, and 180-degree orientations of FIGS. 2A-2O, respectively, the minimum bend radius (MBR) experienced by the conductor 132 is at the zero-degree orientation. Contact surfaces 208(1), 208(3), and 208(5) of both the slotted barrels 202 and the conduit 204 contribute to defining the minimum bend radius experienced by the conductor 132.

Note also that the length of the orientation-specific protective pathway 206 can change depending upon the orientation of the first and second portions 102 and 104. In this case, the orientation-specific protective pathway 206 experienced by the conductor 132 is longest in the zero-degree orientation as represented by little or no slack 212 is present in the conductor 132. In the 90-degree orientation of FIG. 2B, the orientation-specific protective pathway 206 experienced by the conductor 132 is relatively shorter and hence more slack 212 is present in the conductor 132. In the 180-degree orientation of FIG. 2C, the orientation-specific protective pathway 206 experienced by the conductor 132 is even shorter as reflected by still more slack 212 present in the conductor 132. Thus, this implementation can provide a technical solution that provides a longer, gradually bending protective path for the conductor at high bend angles (e.g., the closed orientation) and shorter protective path where the conductor is subject to less bending (e.g., the 180-degree orientation).

Many conductors 132 will not stretch and/or experiencing tension can damage interconnections. Incorporating slack 212 (e.g., extra conductor length) in the conductors 132 at the orientations associated with relatively shorter orientation-specific protective pathways 206, can ensure that sufficient conductor length is available when the conductor experiences the longer orientation-specific protective pathways 206, such as at the closed orientation to avoid subjecting the conductors 132 to tension forces. Stated another way, conductor length can be selected based upon the longest pathway experienced by the conductors and slack may occur at shorter pathway lengths at other orientations.

Figure 3B:
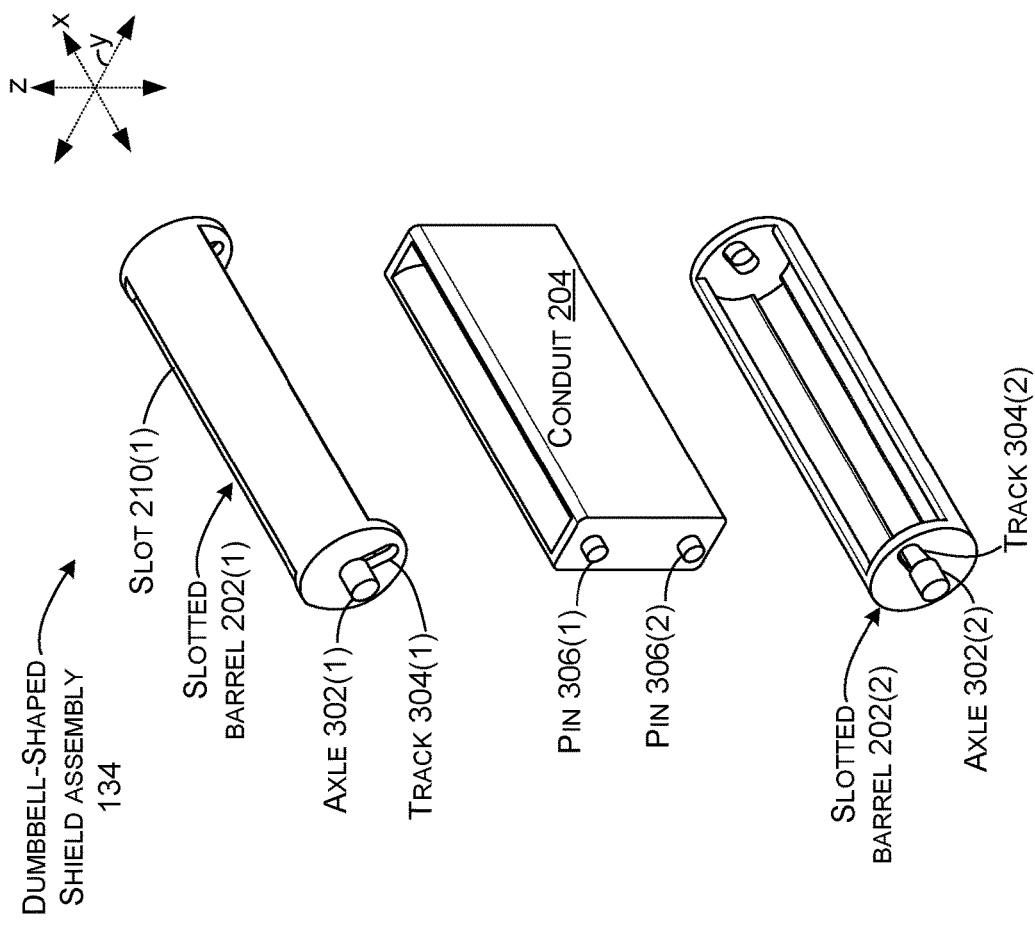
FIGS. 3B, 4B, and 5B show exploded perspective views of example devices in accordance with some implementations of the present concepts.
Figure 3A:
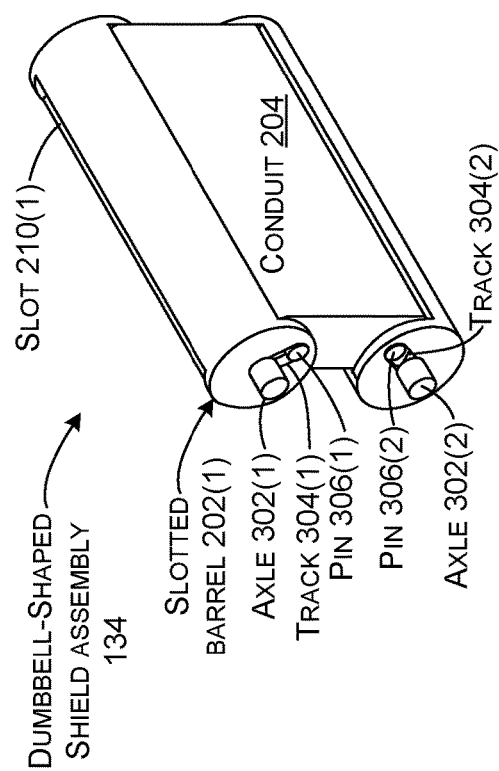

FIGS. 3A-3E collectively show aspects of the dumbbell-shaped shield assembly 134 in the closed or zero-degree orientation of FIGS. 1A and 2A. FIG. 3A shows dumbbell-shaped shield assembly 134 in isolation at the zero-degree orientation and FIG. 3B is a similar exploded view of the dumbbell-shaped shield assembly 134. FIG. 3C shows a (side) elevational view that is similar to FIG. 3A. FIG. 3D is a 'front' elevational view. FIGS. 3E-3G are sectional views as indicated in FIG. 3D. Note that the elements described below are only designated in FIGS. 3A and 3B on the end of the dumbbell-shaped shield assembly 134 facing the reader. Corresponding elements occur on the opposite end, but may not be visible in these views.

As can be seen in FIGS. 3A-3C, slotted barrel 202(1) can include a first axle 302(1). The first axle 302(1) can reside in the first portion housing 116 (FIG. 1C) and can be oriented parallel to the hinge axis HA1 of FIG. 1A. In some configurations, the first axle 302(1) can be coincident with the hinge axis (HA1). In other cases, the first axle can be parallel to, but offset from the hinge axis HA1. The first axle 302(1) can associate the slotted barrel 202(1) with the first portion housing so that the slotted barrel 202(1) can rotate relative to the first portion housing.

Similarly, slotted barrel 202(2) includes a second axle 302(2). The second axle 302(2) can reside in the second portion housing 118 (FIG. 1C) and can be oriented parallel to the hinge axis HA2 of FIG. 1A. In some configurations, the second axle 302(2) can be coincident with the hinge axis (HA2). In other cases, the second axle can be parallel to, but offset from the hinge axis HA2. The second axle 302(2) can associate the slotted barrel 202(2) with the second portion housing so that the slotted barrel 202(2) can rotate relative to the second portion housing.

Note that in an alternative configuration, the first portion housing could define opposing inwardly facing pins that reside in opposing outwardly facing dimples on the ends of the slotted barrel 202(1) and the second portion housing could define opposing inwardly facing pins that reside in opposing outwardly facing dimples on the ends of the slotted barrel 202(2). Still other configurations are contemplated.

Figure 6:
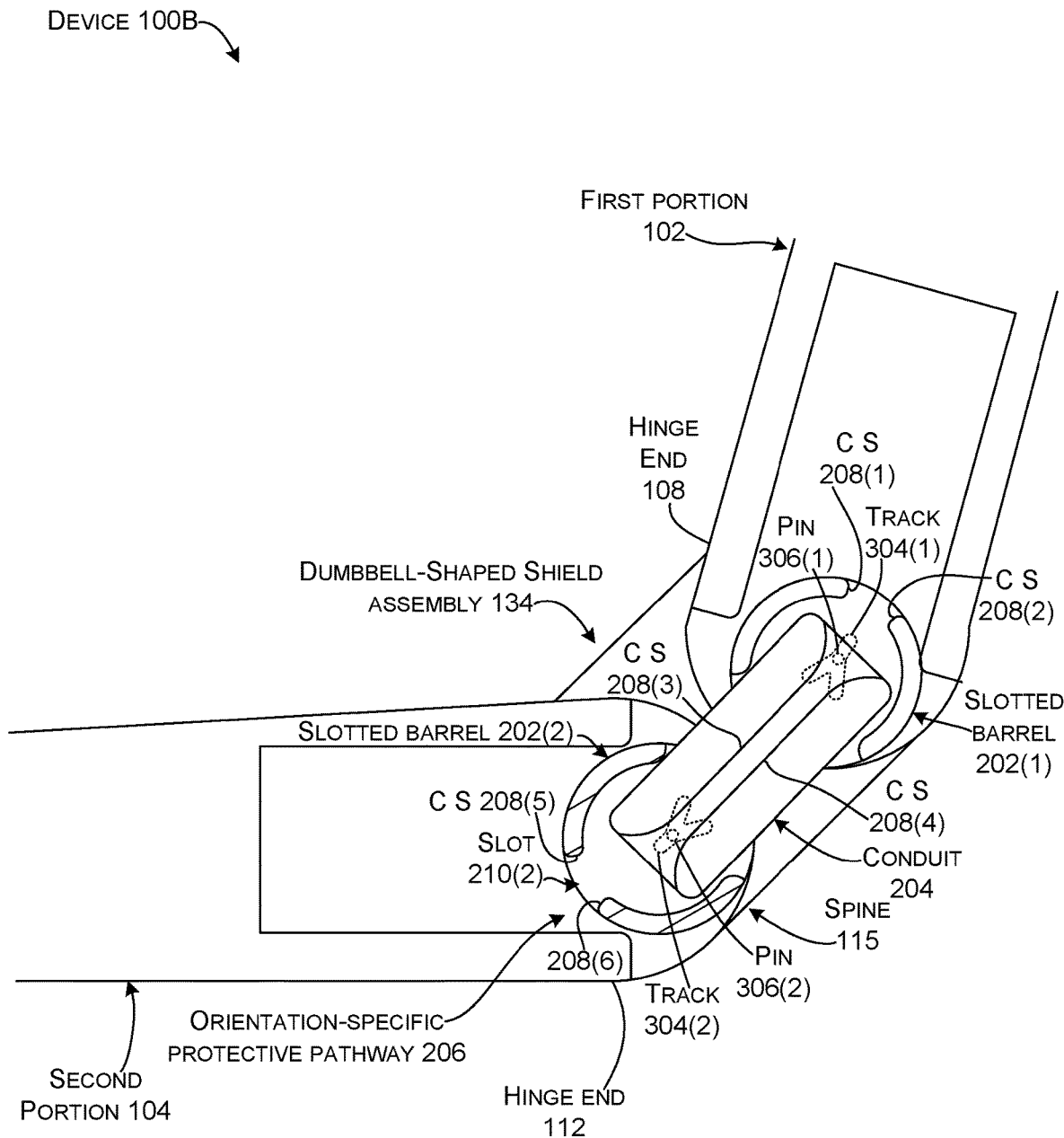

The slotted barrels 202 can also define tracks 304. The tracks 304 can receive pins 306 defined by the conduit 204. The pins 306 can be retained in the tracks 304. The combination of the tracks 304 and the pins 306 can associate the conduit 204 with the slotted barrels 202 and allow movement/interaction that includes both relative rotation and translation between the conduit 204 and the slotted barrels 202. In this case, the tracks 304 are generally linear. An alternative non-linear track configuration is illustrated in FIG. 6.

Recall that FIGS. 3A-3G show the dumbbell-shaped shield assembly 134 in the zero-degree orientation where the dumbbell-shaped shield assembly 134 provides a relatively long orientation-specific protective pathway 206. FIG. 3C shows one aspect that contributes to the relatively long orientation-specific protective pathway. At this zero-degree orientation, the pins 306 are in the distal ends of the tracks 304 and the conduit 204 has moved to the right (e.g., in the +Y reference direction) relative to the slotted barrels 202. The extent of this relative movement is controlled by the length of the tracks 304. At this point, the pins 306 are at the ends of the tracks 304 and are prevented from moving farther. This relative movement has also rotated the slotted barrels 202 (on axles 302) so that the contact surfaces 208 of the slotted barrels 202 and the conduit 204 are oriented generally in a 'C' shape that collectively defines the minimum bend radius for the conductor as discussed relative to FIG. 2A.

Figure 4A:
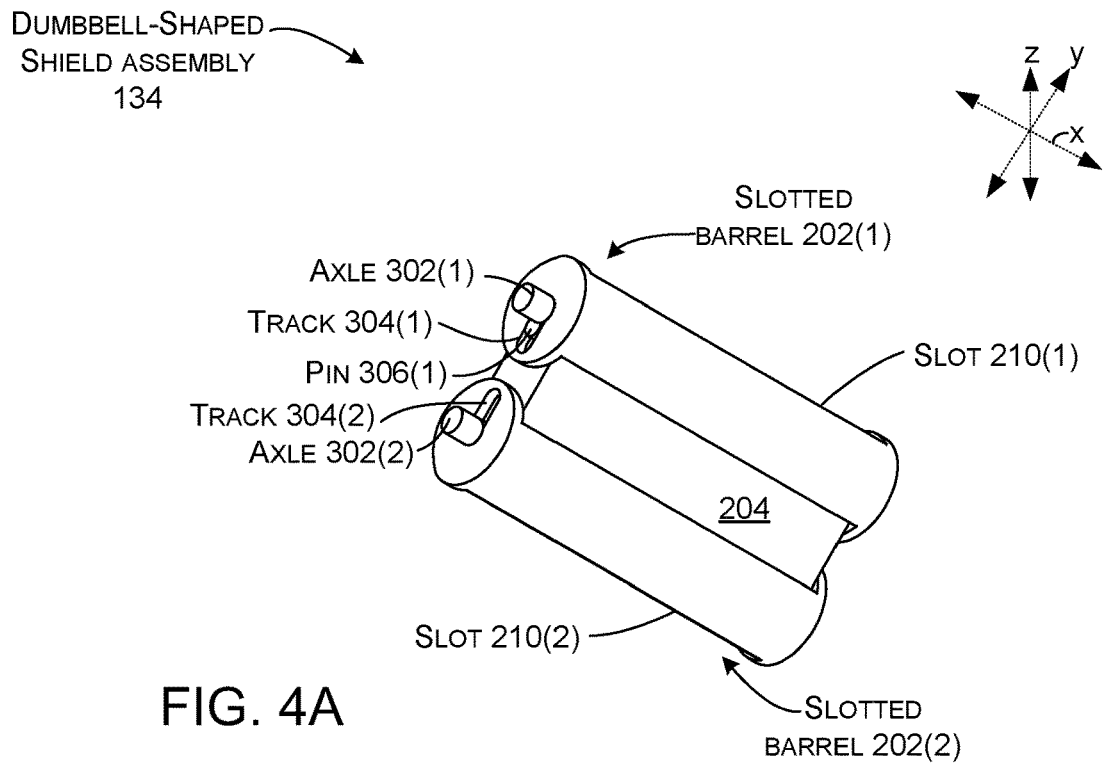
Figure 4B:
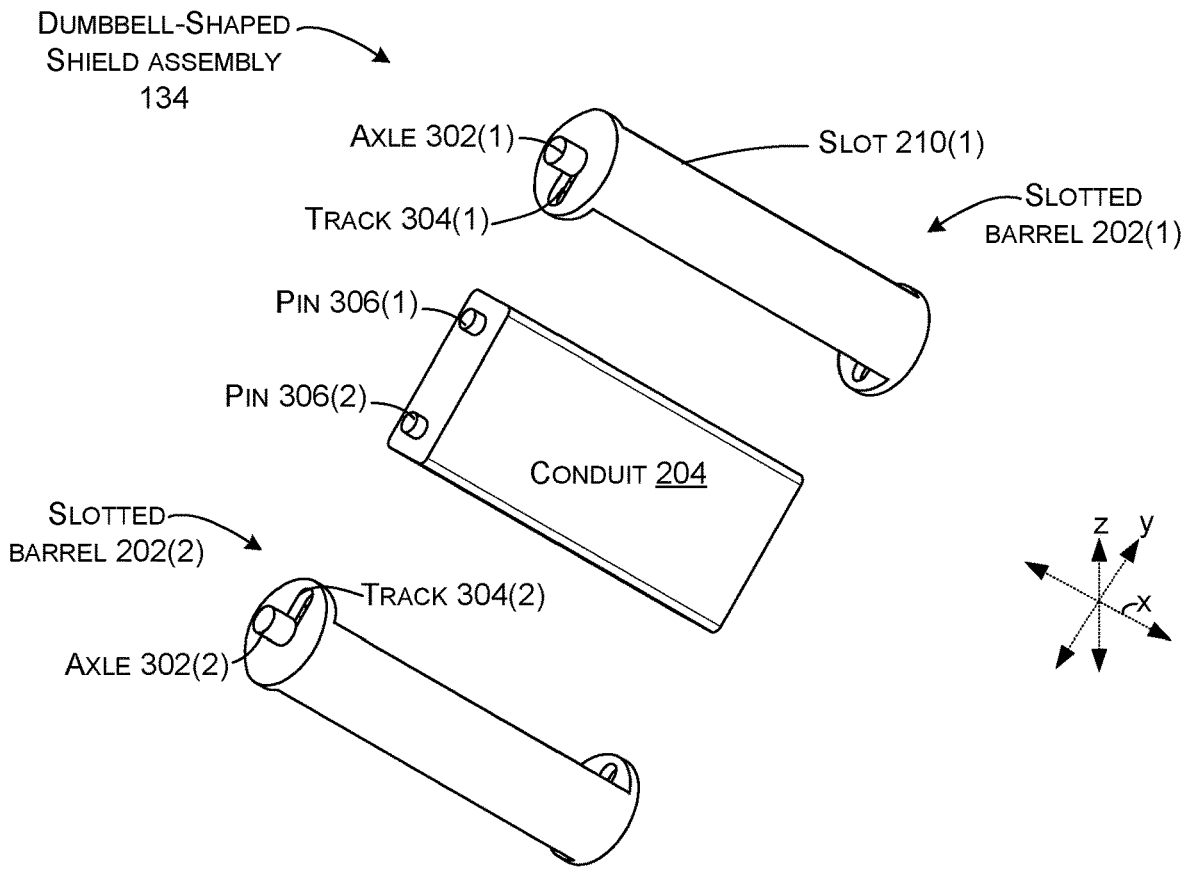
Figure 4E:
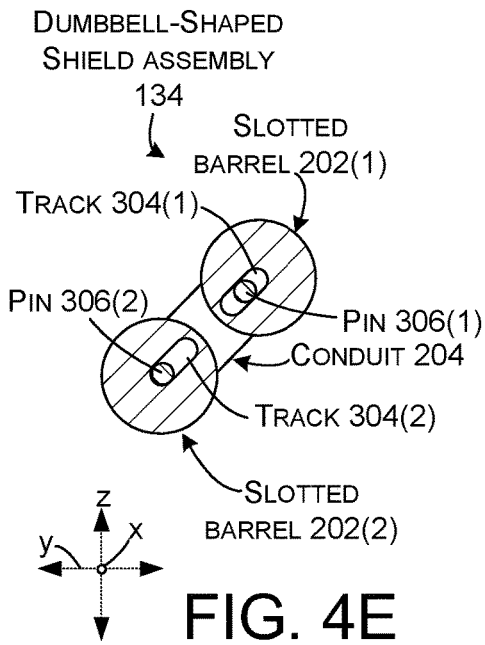
Figure 4F:
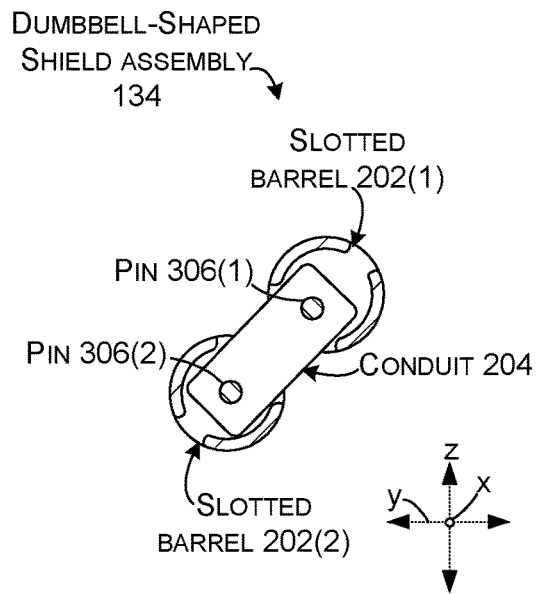
Figure 4G:
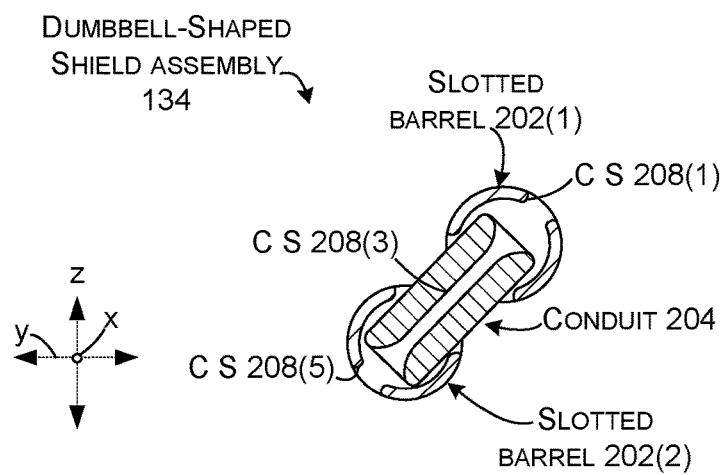

FIGS. 4A-4G show the dumbbell-shaped shield assembly 134 in the 90-degree orientation. At this point, as can be seen in FIG. 4C, pin 306(1) has moved halfway along track 304, and pin 306(2) has moved all the way from the distal end to the central end. Thus, the orientation-specific protective pathway 206 has shortened, such as by approximately a length of one-and-a-half track lengths compared to the zero-degree orientation of FIGS. 3A-3G. This aspect can be seen by comparing FIGS. 2A, 2B, and 2C. In the zero-degree orientation of FIG. 2A, the orientation-specific protective pathway 206 experienced by the conductor 132 is relatively long, so there is relatively little slack 212 in the conductor. In the 90-degree orientation of FIG. 2B, the orientation-specific protective pathway 206 experienced by the conductor 132 is slightly shorter, so more slack 212 occurs in the conductor. In the 180-degree orientation of FIG. 2O, the orientation-specific protective pathway 206 experienced by the conductor 132 is even shorter so there is even more slack 212 in the conductor.

Note that the present implementation is not confined in movement relative to the two slotted barrels 202. This aspect can be evidenced by pin 306(1) being at a different position in track 304(1) than pin 306(2) in track 304(2). At this point (e.g., at the 90-degree orientation), the slotted barrels 202 have rotated on their axles 302 so that the contact surfaces 208 (FIG. 4G) are aligned to create a generally linear and shorter orientation-specific protective pathway 206 for the conductor 132 (as indicated in FIG. 2B).

Thus, this implementation provides a technical solution of providing rigid components to protect the conductor 132 that can follow rotation associated with the hinge assemblies 106 without binding. The technical solution can allow the rotation and/or translation between the housings 116, 118, slotted barrels 202 and/or conduit 204 (e.g., the slotted barrels 202 can move relative to the housings 116 and 118 and the conduit 204 can move relative to the slotted barrels 202). This technical solution can allow the dumbbell-shaped shield assembly 134 to passively follow rotation of the housings 116 and/or 118 around the hinge axes defined by the hinge assembly while continually providing the orientation-specific protective pathway 206 to protect the conductor 132 (FIGS. 2A-2C).

FIGS. 5A-5G show the dumbbell-shaped shield assembly 134 at the 180-degree orientation. At this point, the orientation-specific protective pathway 206 is at its shortest length. This aspect is evidenced with the conduit 204 linearly aligned between the slotted barrels 202. The pins 306 are at the central ends of the tracks 304 and thus the orientation-specific protective pathway 206 is shortened by at least the length of the tracks. This aspect can also be seen by comparing FIG. 2C to FIG. 2A. Note also that the contact surfaces 208 are linearly aligned on each side of the orientation-specific protective pathway 206 to maintain the conductor along the orientation-specific protective pathway 206.

Figure 5A:
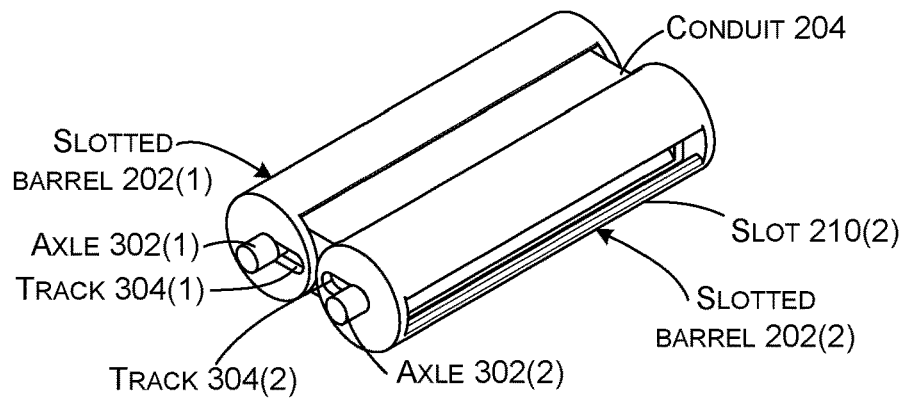
Figure 5B:
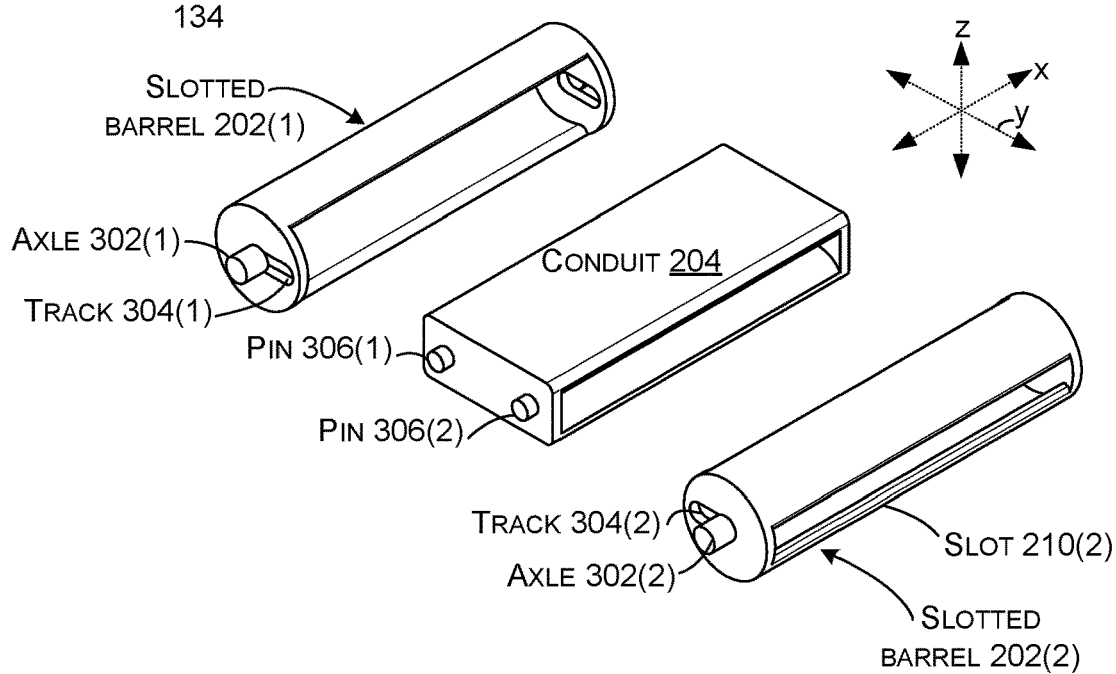
Figure 5C:
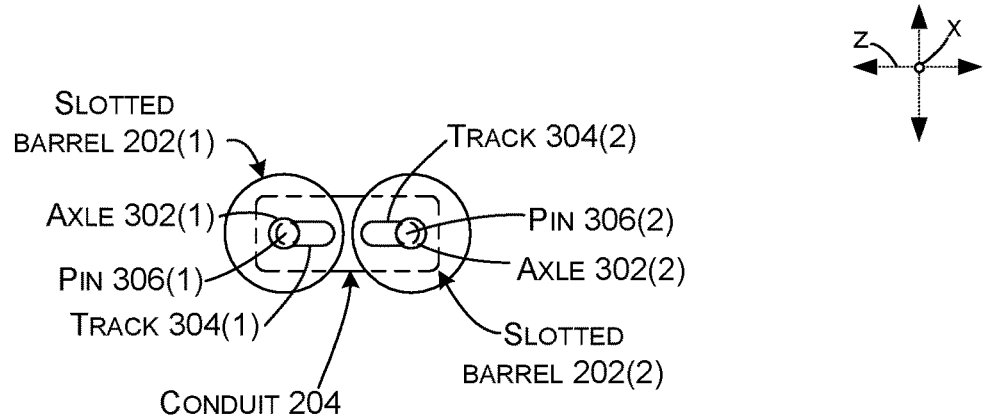
Figure 5D:
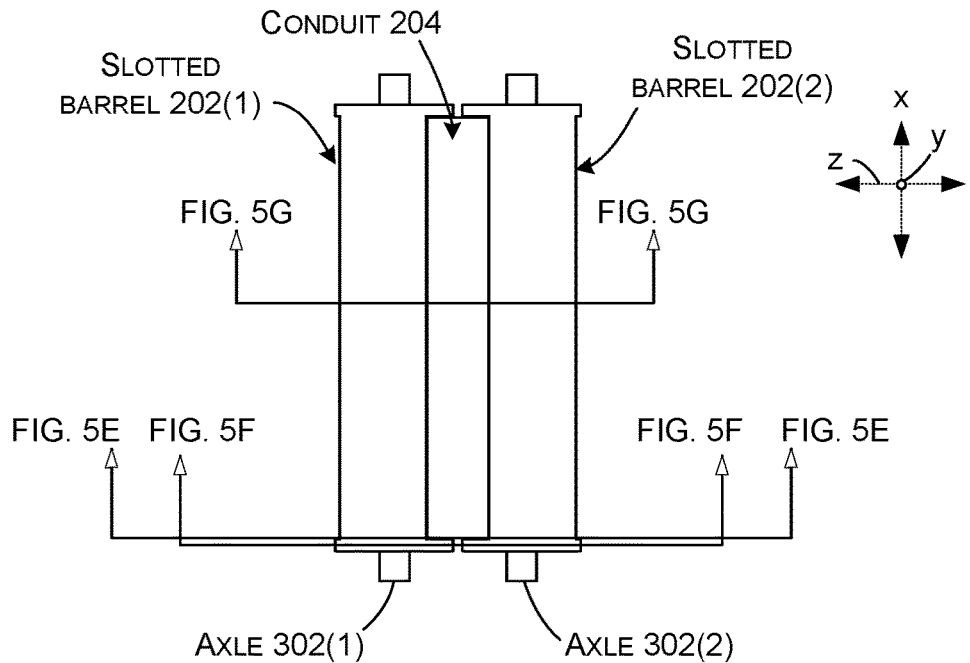
Figure 5E:
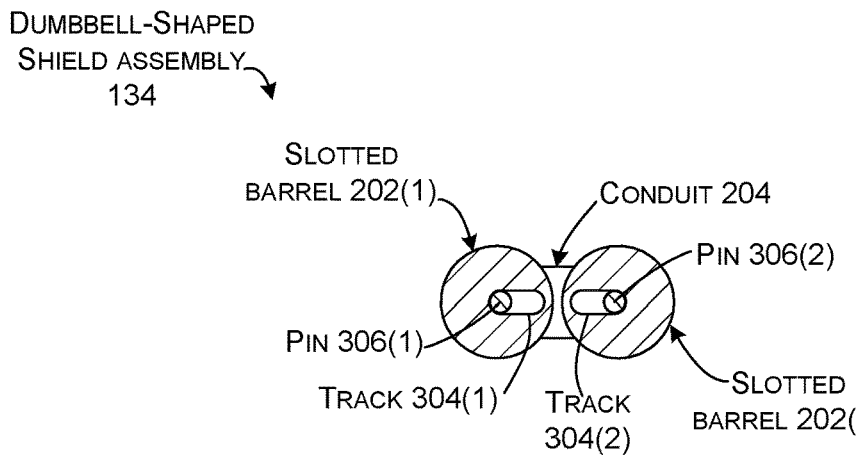
Figure 5F:
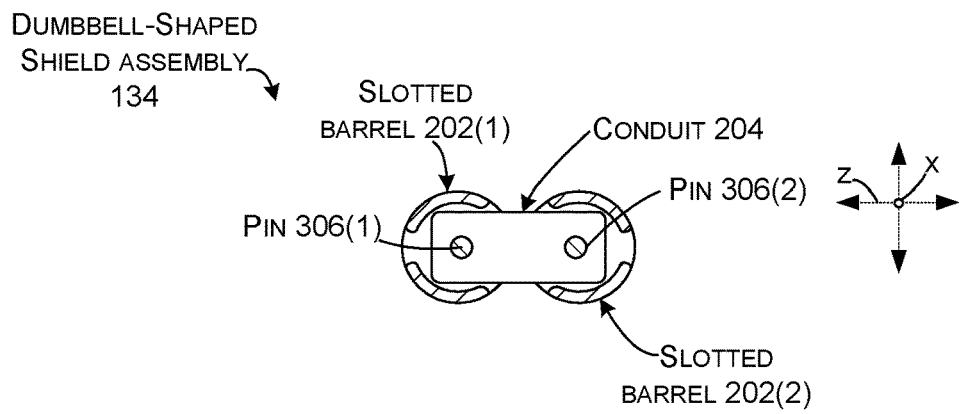
Figure 5G:
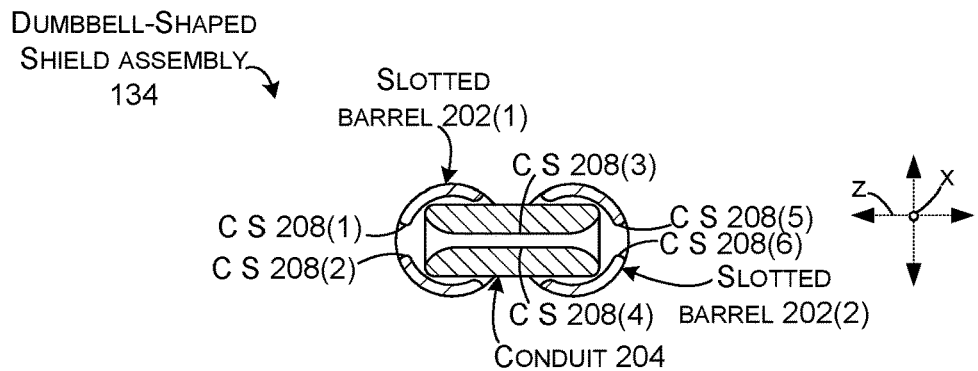

The 'dumbbell shape' of the dumbbell-shaped shield assembly 134 is readily apparent in FIG. 5C. As used herein, 'dumbbell shape' and 'dumbbell shaped' means two relatively wider components with a relatively thinner component in between. Here, the wider components are the slotted barrels 202 and the narrow component is the conduit 204. The shapes of the components can vary from those shown here while still maintaining the relatively wide-narrow-wide ratios of a 'dumbbell shape'.

FIG. 6 shows another example device 100B that is manifest as a notebook computer. In this example, the tracks 304 can be defined by the conduit 204 and the pins 306 can be defined by the slotted barrels 202. Further, the tracks 304 have a non-linear shape to accommodate desired translation between the slotted barrels 202 and the conduit 204.

The present implementations can employ rigid bodies/components in the form of a conduit interposed between first and second slotted barrels. Relative movement can occur between the first slotted barrel and the first portion and the second slotted barrel and the second portion as well as between the conduit and the two slotted barrels. This relative movement allows rigid slotted barrels and conduits to be employed so that no components of the dumbbell-shaped shield assembly need to flex during the range of rotation. This configuration provides a technical solution of rotating and/or translating rigid bodies that collectively provide an orientation-specific protective pathway. This technical solution provides better reliability than flexing/flexible components which are more prone to failure through repeated rotation cycles.

Individual elements of the hinge assemblies and/or the dumbbell-shaped shield assembly can be made from various materials, such as metals, plastics, and/or composites. These materials can be prepared in various ways, such as in the form of sheet metals, die cast metals, machined metals, metal injection molding (MIM), 3D printed materials, molded or 3D printed plastics, and/or molded or 3D printed composites, among others, and/or any combination of these materials and/or preparations can be employed.

The present hinge assembly and shield assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies, shield assemblies, and/or devices are contemplated beyond those shown above relative to FIGS. 1A-6.

Although techniques, methods, devices, systems, etc., pertaining to shield assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion including a first electronic component and a second portion including a second electronic component, a hinge assembly rotatably securing the first and second portions through a range of rotation from a closed orientation to an open orientation, and a dumbbell-shaped shield assembly configured to provide an orientation-specific protective pathway between the first portion and the second portion for a conductor extending from the first electronic component to the second electronic component.

Another example can include any of the above and/or below examples where the hinge assembly defines a spine between the first and second portions.

Another example can include any of the above and/or below examples where the orientation-specific protective pathway completely encapsulates the conductor through the spine through the range of rotation.

Another example can include any of the above and/or below examples where the hinge assembly rotatably secures the first and second portions around a first hinge axis associated with the first portion and a second hinge axis associated with the second portion.

Another example can include any of the above and/or below examples where the dumbbell-shaped shield assembly comprises a first slotted barrel associated with the first portion and a second slotted barrel associated with the second portion.

Another example can include any of the above and/or below examples where the dumbbell-shaped shield assembly further comprises a conduit interposed between the first slotted barrel and the second slotted barrel.

Another example can include any of the above and/or below examples where the first slotted barrel, the conduit, and the second slotted barrel collectively define the orientation-specific protective pathway.

Another example can include any of the above and/or below examples where the first slotted barrel is configured to rotate relative to the first portion and the second slotted barrel is configured to rotate relative to the second portion.

Another example can include any of the above and/or below examples where the conduit is configured to rotate and/or translate relative to the first slotted barrel and the second slotted barrel.

Another example can include a device comprising a first portion including a first electronic component and a second portion including a second electronic component, a hinge assembly rotatably securing the first and second portions through a range of rotation from a closed orientation to an open orientation, a first slotted barrel associated with the first portion and a second slotted barrel associated with the second portion, and a conduit including a first pin associated with the first slotted barrel and a second pin associated with the second slotted barrel to collectively define an orientation-specific protective pathway between the first portion and the second portion for a conductor extending from the first electronic component to the second electronic component.

Another example can include any of the above and/or below examples where the first slotted barrel is configured to rotate around a first axis and the second slotted barrel is configured to rotate around a second axis.

Another example can include any of the above and/or below examples where the first slotted barrel defines a first axle that extends along the first axis and that resides in the first portion and the second slotted barrel defines a second axle that extends along the second axis and that resides in the second portion.

Another example can include any of the above and/or below examples where the conduit defines a first pin associated with the first slotted barrel and a second pin associated with the second slotted barrel.

Another example can include any of the above and/or below examples where the first pin of the conduit is retained in a first track defined by the first slotted barrel and the second pin of the conduit is retained in a second track defined by the second slotted barrel Another example can include any of the above and/or below examples where the first track and the second track are linear or wherein the first track and the second track are not linear and wherein the first track and the second track are identical or different.

Another example can include any of the above and/or below examples where interaction of the first pin and the first track is configured to allow the conduit to both rotate and translate relative to the first slotted barrel, and wherein interaction of the second pin and the second track is configured to allow the conduit to both rotate and translate relative to the second slotted barrel.

Another example can include any of the above and/or below examples where the first slotted barrel, the conduit, and the second slotted barrel, define inwardly-facing contact surfaces that collectively define an orientation-specific protective pathway and a minimum bend radius experienced by the conductor through the range of rotation.

Another example can include a device comprising a first portion including a first display and a second portion including a second display, a hinge assembly rotatably securing the first and second portions through a range of rotation from a zero-degree orientation where the first display and the second display are closed against one another to an open orientation where the first display and the second display form an oblique angle, and a dumbbell-shaped shield assembly configured to provide an orientation-specific protective pathway between the first portion and the second portion for a conductor extending from the first display to the second display.

Another example can include any of the above and/or below examples where the hinge assembly comprises first and second hinge assemblies positioned at ends of a spine between the first and second portions and the dumbbell-shaped shield assembly is interposed between the first and second hinge assemblies.

Another example can include any of the above and/or below examples where the dumbbell-shaped shield assembly extends along an entirety of the spine between the first and second hinge assemblies or wherein the dumbbell-shaped shield assembly extends along less than an entirety of the spine between the first and second hinge assemblies.

The invention claimed is:

1. A device, comprising:
a first portion including a first electronic component and a second portion including a second electronic component;
first and second spaced apart hinge assemblies rotatably securing the first and second portions through a range of rotation from a closed orientation to an open orientation; and,
a dumbbell-shaped shield assembly spaced between and separate from the first and second spaced apart hinge assemblies and configured to provide an orientation-specific protective pathway between the first portion and the second portion for a conductor extending from the first electronic component to the second electronic component.

2. The device of claim 1, wherein the first and second spaced apart hinge assemblies define a spine between the first and second portions.

3. The device of claim 2, wherein the orientation-specific protective pathway completely encapsulates the conductor through the spine through the range of rotation.

4. The device of claim 1, wherein the first and second spaced apart hinge assemblies rotatably secure the first and second portions around a first hinge axis associated with the first portion and a second hinge axis associated with the second portion.

5. The device of claim 4, wherein the dumbbell-shaped shield assembly comprises a first slotted barrel associated with the first portion and that is configured to rotate parallel to the first hinge axis and a second slotted barrel associated with the second portion and that is configured to rotate parallel to the second hinge axis.

6. The device of claim 5, wherein the dumbbell-shaped shield assembly further comprises a conduit interposed between the first slotted barrel and the second slotted barrel.

7. The device of claim 6, wherein the first slotted barrel, the conduit, and the second slotted barrel collectively define the orientation-specific protective pathway.

8. The device of claim 7, wherein the first slotted barrel is configured to rotate coincident with the first hinge axis and the second slotted barrel is configured to rotate coincident with the second hinge axis.

9. The device of claim 8, wherein the conduit is configured to rotate and/or translate relative to the first slotted barrel and the second slotted barrel.

10. A device, comprising:
a first portion including a first electronic component and a second portion including a second electronic component;
a hinge assembly rotatably securing the first and second portions along first and second hinge axes through a range of rotation from a closed orientation to an open orientation;
a first slotted barrel associated with the first portion and configured to rotate parallel to the first hinge axis and a second slotted barrel associated with the second portion and configured to rotate parallel to the second hinge axis; and,
a conduit including a first pin associated with the first slotted barrel and a second pin associated with the second slotted barrel to collectively define an orientation-specific protective pathway between the first portion and the second portion for a conductor extending from the first electronic component to the second electronic component.

11. The device of claim 10, wherein the first slotted barrel is configured to rotate around a first axis that is coincident with the first hinge axis and the second slotted barrel is configured to rotate around a second axis that is coincident with the second hinge axis, or wherein the first slotted barrel is configured to rotate around a first axis that is parallel to and offset from the first hinge axis and the second slotted barrel is configured to rotate around a second axis that is parallel to and offset from the second hinge axis.

12. The device of claim 11, wherein the first slotted barrel defines a first axle that extends along the first axis and that resides in the first portion and the second slotted barrel defines a second axle that extends along the second axis and that resides in the second portion.

13. The device of claim 12, wherein the first pin is parallel to the first axle and the second pin is parallel to the second axle.

14. The device of claim 13, wherein the first pin of the conduit is retained in a first track defined by the first slotted barrel and the second pin of the conduit is retained in a second track defined by the second slotted barrel.

15. The device of claim 14, wherein the first track and the second track are linear or wherein the first track and the second track are not linear.

16. The device of claim 15, wherein interaction of the first pin and the first track is configured to allow the conduit to both rotate and translate relative to the first slotted barrel, and wherein interaction of the second pin and the second track is configured to allow the conduit to both rotate and translate relative to the second slotted barrel.

17. The device of claim 15, wherein the first slotted barrel, the conduit, and the second slotted barrel, define inwardly-facing contact surfaces that collectively define an orientation-specific protective pathway and a minimum bend radius experienced by the conductor through the range of rotation.

18. A device, comprising:
- a first portion including a first display and a second portion including a second display;
- first and second spaced apart hinge assemblies rotatably securing the first and second portions along first and second hinge shafts through a range of rotation from a zero-degree orientation where the first display and the second display are closed against one another to an open orientation where the first display and the second display form an oblique angle; and,
- a dumbbell-shaped shield assembly interposed between the first and second spaced apart hinge assemblies and separate from the first and second hinge shafts and configured to provide an orientation-specific protective pathway between the first portion and the second portion for a conductor extending from the first display to the second display.

19. The device of claim 18, wherein the first and second hinge assemblies are positioned at ends of a spine between the first and second portions and the dumbbell-shaped shield assembly is interposed between the first and second hinge assemblies.

20. The device of claim 19, wherein the dumbbell-shaped shield assembly extends along an entirety of the spine between the first and second hinge assemblies or wherein the dumbbell-shaped shield assembly extends along less than an entirety of the spine between the first and second hinge assemblies.

* * * * *